United States Patent [15] 3,697,609
Fukuoka et al. [45] Oct. 10, 1972

[54] METHOD OF PRODUCING 2-CHLOROBUTADIENE-1,3

[72] Inventors: Ichiro Fukuoka; Shoji Kimura; Takehiko Nishimura, all of Tokyo; Satoshi Takahashi, Hatano, all of Japan

[73] Assignee: Denki Kagaku Kogyo Kabushiki Kaisha, Tokyo, Japan

[22] Filed: May 3, 1968

[21] Appl. No.: 727,145

[30] Foreign Application Priority Data

May 19, 1967 Japan ..................42/31470
April 11, 1968 Japan ..................43/23710

[52] U.S. Cl. ...............................260/655, 260/DIG. 5
[51] Int. Cl. .................................................C07c 21/20
[58] Field of Search ..............260/655, 654 D, 656, 260/980, 2.1 E, 2.1 R

[56] References Cited

UNITED STATES PATENTS 2,180,115 11/1939 Lance et al. ................260/655
2,879,311 3/1959 Hawkins ................260/655 X

FOREIGN PATENTS OR APPLICATIONS 719,601 12/1954 Great Britain .........260/650 R

OTHER PUBLICATIONS

Schmidle et al., Ind. and Engineering Chemistry, 44, pp. 1388– 90 (6– 1952) TP1.858
Banks et al., Chemistry and Industry, pp. 296– 7 (2-1959) TP1.563

Primary Examiner—Leon Zitver
Assistant Examiner—Joseph A. Boska
Attorney—Sughrue, Rothwell, Mion, Zinn & Macpeak

[57] ABSTRACT

Production of chloroprene by treating 3,4-dichlorobutene-1 with an anion exchange resin to effect dehydrochlorination of 3,4-dichlorobutene-1. Furthermore, chloroprene can be produced by treating a mixture of 3,4-dichlorobutene-1 and 1,4-dichlorobutene-2 with an anion exchange resin, whereby 3,4-dichlorobutene-1 is dehydrochlorinated preferentially.

12 Claims, No Drawings

METHOD OF PRODUCING 2-CHLOROBUTADIENE-1,3

The present invention relates to a method of producing 2-chlorobutadiene-1,3 (chloroprene) by the dehydrochlorination of 3,4-dichlorobutene-1 and particularly, a method of producing chloroprene preferentially from 3,4-dichlorobutene-1, wherein 3,4-dichlorobutene-1 or a mixture of 3,4-dichlorobutene-1 and 1,4-dichlorobutene-2 is dehydrochlorinated with an anion exchange resin.

The previous production of chloroprene comprises chlorinating 1,3-butadiene in a vapor phase to obtain a mixture of 1,4-dichlorobutene-2 and 3,4-dichlorobutene-1, isolating 3,4-dichlorobutene-1 from the mixture or isomerizing 1,4-dichlorobutene-2 to form 3,4-dichlorobutene-1, and then heating the 3,4-dichlorobutene-1 together with an aqueous alkali solution to produce chloroprene.

In the method of dehydrochlorination by means of an aqueous alkali solution, it has been known that a small amount of 1-chlorobutadiene-1,3 is produced in addition to chloroprene and the presence of 1-chlorobutadiene-1,3 in chloroprene as an impurity imparts undesirable properties to the polymerized chloroprene rubber produced therefrom. Accordingly, it is necessary to separate 1-chlorobutadiene-1,3 from chloroprene by any process, but both the compounds are isomers having similar boiling points, so that it is difficult to separate the small amount of 1-chlorobutadiene-1,3 from the resulting chloroprene. As a means for separating 1-chlorobutadiene-1,3, a process wherein said mixture is subjected to a fractional distillation in the presence of a specific solvent or under an anhydrous condition to produce chloroprene substantially free from 1-chlorobutadiene-1,3, has been proposed. However, such a process has still some drawbacks.

The object of the present invention is to provide chloroprene purely and in a high yield from 3,4-dichlorobutene-1 or a mixture of 3,4-dichlorobutene-1 and 1,4-dichlorobutene-2 formed by the chlorination of 1,3-butadiene.

The inventors have found that such previous defects in the production of chloroprene from 3,4-dichlorobutene-1 can be obviated and chloroprene can be produced easily and in a high yield by treating 3,4-dichlorobutene-1 with an anion exchange resin. This is the first aspect of the invention.

As a process for isolating 3,4-dichlorobutene-1 from a mixture of 1,4-dichlorobutene-2 and 3,4-dichlorobutene-1 produced in the chlorination of 1,3-butadiene in a vapor phase, for example, a process of separation of said mixture by a distillation, has been hitherto proposed, but the boiling points of 3,4-dichlorobutene-1 (boiling point: 115° C, 760 mmHg) and 1,4-dichlorobutene-2 (cis-type: 152.5° C, trans-type: 155.5° C, 760 mmHg) are high, so that if the distillation is carried out under atmospheric pressure, a dehydrochlorination reaction occurs and undesirable results are brought about by polymerization and other side reactions, so that it has been necessary to adopt a troublesome process, wherein the distillation is usually effected under a reduced pressure of about 40 mmHg.

Furthermore, the inventors have found that when such a mixture is treated with an anion exchange resin, 3,4-dichlorobutene-1 is preferentially dehydrochlorinated to form chloroprene, while 1,4-dichlorobutene-2 is inactive to the anion exchange resin under the same condition, and therefore, 1,4-dichlorobutene-2 is not dehydrochlorinated and remains as such and 1,4-dichlorobutene-2 can be easily separated. This is the second aspect of the invention. Namely, the first aspect of the invention consists in a method of producing chloroprene characterized in that 3,4-dichlorobutene-1 is treated with an anion exchange resin at a temperature of 20°– 120° C to form chloroprene and the second aspect of the invention consists in a method of producing chloroprene characterized in that a mixture of 1,4-dichloroburene-2 and 3,4-dichlorobutene-1 is treated with an anion exchange resin at a temperature of 20° to 120° C to effect a preferential dehydrochlorination of 3,4-dichlorobutene-1 to form chloroprene, which is separated from undehydrochlorinated 1,4-dichlorobutene-2 by an atmospheric distillation at a relatively low temperature.

As the anion exchange resin used in this case, use may be made of the same catalyst in both the processes of the first aspect and the second aspect of the invention.

The above described dehydrochlorination reaction may occur with or without a solvent, but it is preferable to use a solvent, because the operation is easy. The anion exchange resin used can be regenerated by a conventional aqueous alkali solution and reused, so that the solvents to be used in the dehydrochlorination are preferably water miscible and for example, alcohols, cyclic ethers, ketones, polyethers, etc. may be used. As these solvents, mention may be made of methyl alcohol, ethyl alcohol, n-propyl alcohol, iso-propyl alcohol, n-butyl alcohol, tert.-butyl alcohol, allyl alcohol, dioxane, furan, tetrahydrofuran, dimethoxyethan, etc. In the second aspect of the invention, considering the separation after the treatment, it is desirable that the boiling point of the solvent is at least 10° C lower than the boiling point of 1,4-dichlorobutene-2.

As the anion exchange resin to be used in the invention, those which are commercially available basic resins and which are strong bases in their hydroxyl form and have a high exchange capacity, are particularly effective, for example, resins having exchange group of $-N-(CH_3)_3X$,

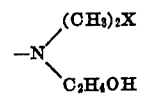

wherein X is OH. The form of such resins may be any of spherical, granular, cylindrical or film forms. The amount of resin used is 0.1 to 10 times equivalent with respect to the amount of 3,4-dichlorobutene-1 and preferably, 1 to 5 times equivalent. If said amount is less than the lower limit, the conversion of 3,4-dichlorobutene-1 decreases. On the other hand, if said amount is more than the upper limit, the resin does not contact with the starting material homogeneously, unless a large amount of solvent is used, and such an amount is not economically preferable. When the solvent is not used, the wetting of the anion exchange resin is insufficient, so that it is natural to reduce the amount of the exchange resin used.

The higher the reaction temperature, the larger the rate of dehydrochlorination reaction is. Of course, the maximum admissible temperature of the anion exchange resin to be used is the limitation. Furthermore, if such a temperature is too high, the formation of 1-chlorobutadiene-1,3 is liable to be increased and therefore, such a temperature is not preferable. On the other hand, if the reaction temperature is too low, the reaction rate is low, so that such a temperature is not practicable. The preferable reaction temperature according to the present invention is 20° to 120° C, more particularly, 30° to 60° C.

The characteristic of the present invention consists in that chloroprene can be produced without forming 1-chlorobutadiene-1,3 by a completely novel means of treatment with an anion exchange resin, which is different from the conventional dehydrochlorination by means of an aqueous alkali solution.

A further characteristic of the present invention consists in that the formation of polymeric materials can be considerably restricted as compared with the case of dehydrochlorination by means of an aqueous alkali solution at a higher temperature, because the operation temperature is relatively low.

A further remarkable characteristic of the present invention consists in that only 3,4-dichlorobutene-1 in the mixture of 3,4-dichlorobutene1 and 1,4-dichlorobutene-2 can be dehydrochlorinated into 2-chlorobutadiene-1,3 without separating said mixture and the resulting 2-chlorobutadiene-1,3 can be separated from the mixture of said compound and 1,4-dichlorobutene-2 by a distillation at a relatively low temperature and under atmospheric pressure, so that a distillation under a reduced pressure is not necessary and further undesirable reactions, such as polymerization, dehydrochlorination and the like do not occur in the operation.

The invention will be explained in more detail by the following examples, which are not intended to limit the scope of the invention. In the examples, "Part" means by weight.

EXAMPLE 1

Into a glass ampoule, which had been previously purged with nitrogen, were charged an anion exchange resin in the hydroxyl form (Made by Tokyo Yukikagaku Kogyo K.K., Trade mark: Amberlite IRA-410), 3,4-dichlorobutene-1 and a solvent in ratios as shown in the following Table 1, and the ampoule was sealed under nitrogen atmosphere. Then the ampoule was rotated and stirred in a thermostat maintained at a predetermined temperature as shown in the following Table 1 and the reaction was effected for 5 hours. Amberlite IRA-410 is an anion exchange resin in the hydroxyl form of the formula:

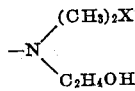

, wherein X is OH.

After the reaction was completed, the ampoule was opened and the composition of liquid reaction product was analyzed by gas chromatography. Separately, polymeric substance was confirmed by a precipitation process by means of methyl alcohol. The result is shown in Table 1.

EXAMPLE 2

The treatment in this example was effected in substantially the same manner as described in Example 1, except that the reaction temperature was varied to 20° C. The result is shown in Table 1.

EXAMPLES 3 and 4

The treatments in these examples were effected in substantially the same manner as described in Example 1, except that the amounts of anion exchange resin and solvent added were varied as described in Table 1. The result is shown in Table 1.

EXAMPLE 5

The treatment in this example was effected in substantially the same manner as described in Example 1, except that the solvent was varied to ethyl alcohol. The result is shown in Table 1.

EXAMPLE 6

The treatment in this example was effected in substantially the same manner as described in Example 5, except that the amounts of anion exchange resin and solvent added were varied as described in Table 1. The result is shown in Table 1.

EXAMPLE 7

The treatment in this example was effected in substantially the same manner as described in Example 4, except that the starting material and the solvent were varied to a mixture of 68 percent of 1,4-dichlorobutene-2 and 32 percent of 3,4-dichlorobutene-1, and ethyl alcohol respectively. The result is shown in Table 1.

Further, 100 parts of the above-mentioned liquid reaction product were subjected to an atmospheric distillation to distill off materials having a low boiling point other than dichlorobutenes, whereby 1.7 parts (yield: 97.6 percent) of chloroprene were obtained. The residue, the amount of which was 5.2 parts, was analyzed by gas chromatography and it was confirmed that such a residue was 1,4-dichlorobutene-2.

In the above-mentioned treatment, 1-chlorobutadiene-1,3 and polymeric material were not substantially produced.

EXAMPLE 8

Into a cylindrical glass reaction vessel of an inner diameter of 15 mm and a length of 300 mm equipped with a jacket, were charged 40 parts of the same anion exchange resin as used in Example 1, and air in the reaction vessel was purged thoroughly with nitrogen. Then the vessel was kept at a constant temperature of 45° C and 20 parts of the same raw materials as used in Example 7, which had been diluted with 240 parts of ethyl alcohol, were passed through the layer of resin at a rate of 100 parts/hour.

The effluent was analyzed by gas chromatography to obtain a result as shown in Table 1.

EXAMPLE 9

The treatment in this example was effected in substantially the same manner as described in Example 1, except that the solvent of dioxane was not used and the amount of anion exchange resin added was varied. The result is shown in Table 1.

COMPARATIVE EXAMPLE 1

Into a reaction vessel equipped with an inlet for nitrogen and a reflux condenser was charged 10 percent sodium hydroxide solution, and ⅔ equivalent of 3,4-dichlorobutene-1 based on the sodium hydroxide was added thereto under nitrogen atmosphere. The resulting mixture was heated at 70° C for 1 hour to produce chloroprene.

After the reaction was completed, the reaction product was cooled to room temperature, filtered to separate oil phase and dried. The dried product was analyzed in substantially the same manner as described in Example 1. The result is shown in Table 1.

COMPARATIVE EXAMPLE 2

100 parts of the same mixture of raw dichlorobutenes as described in Example 7 were separated by an atmospheric distillation and the following fractions were confirmed by gaschromatography.

| | |
|---|---|
| 1-chlorobutadiene-1,3 | 3.0 parts |
| 3,4-dichlorobutene-1 | 25.0 parts (Yield: 78.1%) |
| 1,4-dichlorobutene-2 | 54.0 parts (Yield: 79.4%) |
| Residue (high boiling point materials) | 18.0 parts |

, wherein X is OH, and thereafter separating chloroprene from 1,4-dichlorobutene-2, which is inactive to the anion exchange resin at reaction conditions.

2. The method as claimed in claim 1, wherein said contacting is effected in the presence of a solvent for the 3,4-dichlorobutene-1 and the 1,4-dichlorobutene-2.

3. The method as claimed in claim 2, wherein said solvent is at least one compound selected from the group consisting of methyl alcohol, ethyl alcohol, n-propyl alcohol, iso-propyl alcohol, n-butyl alcohol, tert.-butyl alcohol, allyl alcohol, dioxane, furan, tetrahydrofuran and dimethoxyethane.

4. The method as claimed in claim 2, wherein said solvent is ethyl alcohol.

5. The method as claimed in claim 2, wherein said solvent is dioxane.

6. The method as claimed in claim 1, which further comprises subjecting the reaction product obtained by treating said mixture of 1,4-dichlorobutene-2 and 3,4-dichlorobutene-1 with the anion exchange resin to an atmospheric distillation at a relatively low temperature to separate chloroprene from undehydrochlorinated 1,4-dichlorobutene-2.

7. The process of claim 2 wherein said solvent is water-miscible.

8. The process of claim 1 wherein said solvent boils at a temperature at least 10° C lower than the boiling point of 1,4-dichlorobutene-2.

9. The method of claim 1 wherein said separation is at atmospheric pressure.

10. The method of claim 1 which further comprises regenerating the anion exchange resin, after use, with an aqueous alkali solution.

11. The method of claim 1 wherein said chloroprene is formed without the production of substantial amounts of by-product 1-chlorobutadiene-1,3 or polymeric by-products.

12. The method of claim 1 where the temperature is from 30° to 60° C.

TABLE 1

| Example No. | 1* Amount of resin (equiv ratio) | 2* Amount of of solvent (volume ratio). | Reaction condition °C | Reaction condition Hrs. | Conversion of 3,4-dichlorobutene-1 (percent) | 3* Production of chloroprene (percent) | 4* Production of 1-chloro-butadiene-1,3 (percent) | 5* Production of polymeric materials (percent) |
|---|---|---|---|---|---|---|---|---|
| 1 | 1/2 | Dioxane 5/2 | 45 | 5 | 12.4 | 100.0 | 0 | 0 |
| 2 | 1/2 | Dioxane 5/2 | 20 | 5 | 5.0 | 100.0 | 0 | 0 |
| 3 | 2/1 | Dioxane 6/1 | 45 | 5 | 30.4 | 99.7 | 0.3 | 0 |
| 4 | 4/1 | Dioxane 12/1 | 45 | 5 | 83.3 | 99.9 | 0.1 | 0 |
| 5 | 1/2 | Ethyl alcohol 5/2 | 45 | 5 | 15.6 | 100.0 | 0 | 0 |
| 6 | 2/1 | Ethyl alcohol 6/1 | 45 | 5 | 36.8 | 99.9 | 0.1 | 0 |
| 7 | 4/1 | Ethyl alcohol 12/1 | 45 | 5 | 100.0 | 100.0 | 0 | 0 |
| 8 | 4/1 | Ethyl alcohol 12/1 | 45 | | 100.0 | 100.0 | 0 | 0 |
| 9 | 1/4 | | 45 | 5 | 5.0 | 99.0 | 0.1 | 0 |
| Comparative Example 1 | | | 70 | 1 | 73.5 | 95.5 | 3.2 | 1.3 |

* 1 and 2 based on 3,4 dichlorobutene-1, 3, 4 and 5 based on converted 3,4-dichlorobutene-1.

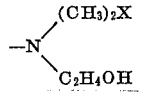

What is claimed is:

1. A method of producing chloroprene by selectively dehydrochlorinating 3,4-dichlorobutene-1 in a mixture of 1,4-dichlorobutene-2, and 3,4-dichlorobutene-1, which comprises contacting a mixture of 1,4-dichlorobutene-2, and 3,4-dichlorobutene-1 with an anion exchange resin in the hydroxyl form in an amount of from 0.1 to 10 times the equivalent amount with respect to the amount of 3,4-dichlorobutene-1, at a temperature of from 20° to 120° C, said anion exchange resin containing exchange groups from the class consisting of —N—(CH₃)₃X, and